May 18, 1943  M. E. WIDELL  2,319,280
CONVEYER
Filed May 17, 1941
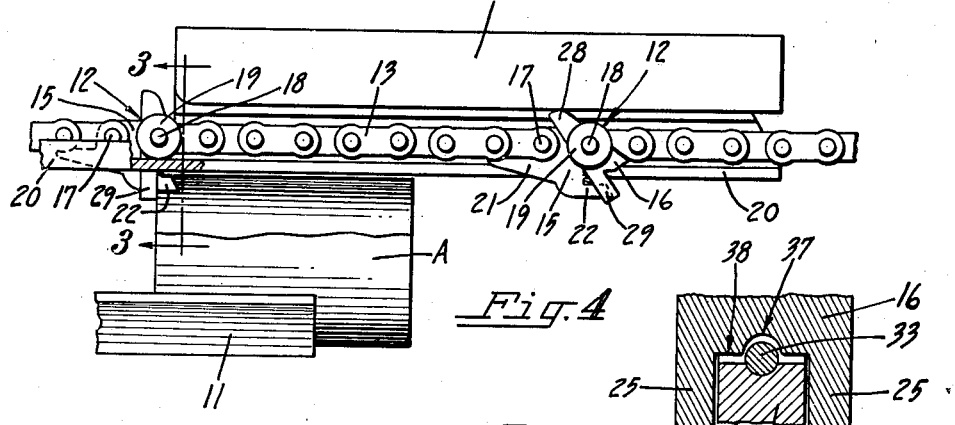
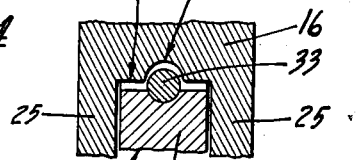
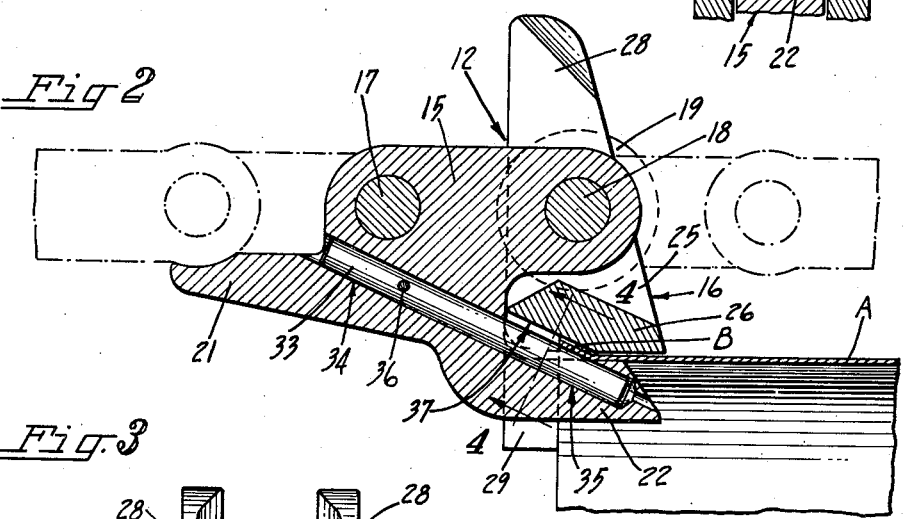
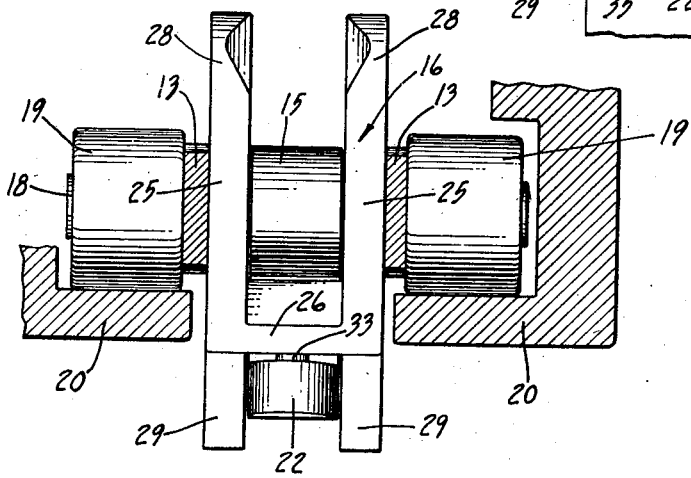
INVENTOR
Mangus E. Widell
BY Ivan D. Thornburgh
Chas. H. Erne
ATTORNEYS Patented May 18, 1943

2,319,280

UNITED STATES PATENT OFFICE 2,319,280

CONVEYER

Magnus E. Widell, Cincinnati, Ohio, assignor to American Can Company, New York, N. Y., a corporation of New Jersey Application May 17, 1941, Serial No. 394,011

4 Claims. (Cl. 198—179)

The present invention relates to conveyers for propelling container or can bodies through side seam soldering machines and the like and has particular reference to a conveyer gripper finger for holding the can bodies in a predetermined position relative to the conveyer.

In propelling sheet metal can bodies through a side seam soldering machine the can bodies sometimes rotate sufficiently to throw the side seam out of alignment with the solder applying elements. Hence the solder sometimes is applied to a can body in a place other than the side seam and the seam thus remains unsoldered.

The instant invention contemplates overcoming this difficulty by providing on the conveyer, gripper fingers which are formed with a key to grip and clinch can bodies in a manner which prevents rotation while they are being propelled through the machine.

An object therefore of the invention is the provision on a conveyer, of gripper fingers which grip can bodies with a key action and hold them against rotation while they are being propelled through the machine so that the side seam of the body will be maintained positively in a predetermined position.

Another object is the provision of such a gripper finger which will grip can bodies of varying thickness of stock when the bodies are to be held and which will release the bodies for discharge when desired so that jamming of the can bodies will be prevented.

Another object is the provision of gripper fingers of this character which will hold the can bodies in uniformly spaced order and in a predetermined location on the conveyer so that the bodies will be in proper position for subsequent operations.

Numerous other objects and advantages of the invention will be apparent as it is better understood from the following description, which, taken in connection with the accompanying drawing, discloses a preferred embodiment thereof.

Referring to the drawing:

Figure 1 is a side elevation of a portion of a machine having a conveyer embodying the instant invention, the view showing a can body held in place on the conveyer by a gripper finger, parts being broken away;

Fig. 2 is an enlarged longitudinal vertical section of a portion of the conveyer and a gripper finger carried thereon with a can body in place, with parts broken away;

Fig. 3 is an enlarged transverse vertical section taken substantially along the line 3—3 in Fig. 1, with the can body omitted and with parts broken away; and Fig. 4 is a sectional detail taken substantially along the line 4—4 in Fig. 2.

As a preferred embodiment of the invention the drawing illustrates a portion of a can body side seam soldering machine of the character disclosed in United States Patent 1,178,946, issued April 11, 1916, to F. Rudolphi et al., on Soldering machine. In such a machine tubular sheet metal can bodies A are propelled along longitudinal guide rails 11 while in a horizontal position (Fig. 1) by gripper fingers 12 which are spaced along an endless roller chain conveyer 13.

There are a plurality of the guide rails 11 constituting an outside horn arranged so that the can bodies may pass freely along the inside of the horn, thus confining them against lateral displacement. The horn guides the can bodies along a conventional solder roll (not shown) which applies molten solder to the side seams of the bodies in the usual manner.

The gripper fingers 12, which grip the can bodies while they are propelled along the horn, are preferably made in two parts, a link or carrier part 15 (Figs. 2 and 3) and a clamping dog 16. The link part 15 is formed similar to a block chain link and constitutes a part of the conveyer chain, the link being secured in place by pivot pins 17, 18 which connect it to adjacent links in the chain. The pivot pin 18 carries rollers 19 which ride on tracks 20 and thus the conveyer chain is supported.

The link 15 is formed with a rearwardly extending lug 21 which engages against the adjacent roller link in the chain and thus prevents the gripper finger 12 as a unit from tipping when the gripper finger is carrying a can body. The link is formed with a depending fixed jaw 22 which projects forwardly of the link. The jaw extends into the can body when the finger carries it along the horn rails 11.

The clamping dog 16 is formed with a pair of spaced upright side members 25 which are located one on each side of the link 15. These side members are mounted on the pivot pin 18 and they are formed integrally with a tie-section or clamp jaw 26 which is normally disposed just above the fixed jaw 22 of the link. The side members extend above the pivot pin 18 in the form of tail sections 28 and they also depend below the clamp jaw 26 where they constitute stop lugs 29.

In accordance with usual can making practice the side seam soldering machine is connected to a body making machine. The can bodies leave the body making machine with their side seams down and in the proper position for soldering and are introduced into the horn 11 in this position. The can bodies received in the horn are in the path of travel of the gripper fingers 12 and as a set of the latter come into position adjacent a can body the fixed jaw 22 enters the body so that the wall of the body is interposed between the fixed jaw and the clamp jaw 26 of the clamp dog 16.

The rear edge of the body engages against the depending stop lugs 29 of the clamp dog and as the gripper finger 12 continues to move forward the stationary can body presses against the stop lugs and thus rocks the clamp dog on its pivot pin 18 until the clamp jaw 26 engages against the link 15. This engagement arrests further rocking movement of the clamp dog. The rear edge of the can body thus is located positively relative to the conveyer chain and the several can bodies held by their respective gripper fingers spaced along the chain are thus in positive spaced relation.

The rocking of the clamp dog 16 clamps the can body in the gripper finger and locks it against rotation. For this latter purpose the link 15 is provided with an angularly disposed pin key 33 which is retained with a tight fit in a bore 34 formed in the link and in a continuing bore 35 in the fixed jaw 22. The key may be riveted in place as at 36 if desired. That portion of the key which is located between the bore 34 and the bore 35 extends out of the link wall at an angle and above the body clamping surface of the jaw 22 and constitutes a rounded upwardly projecting and inclined protuberance or key on the fixed jaw. This key fits into a cooperating groove 37 formed in an angularly disposed bottom face 38 of the clamp jaw 26. This face and groove are parallel with the key 33 when the clamp dog 16 is in body clamping position as shown in Fig. 2.

When the fixed jaw 22 first moves into the can body to pick it up and carry it forward, the rear edge of the body rides up on the inclined key 33 and when the clamp dog 16 rocks into body clamping position by reason of the body pushing against the stop lugs 29, the clamp jaw 26 presses the wall of the can body down against and around the key. This action clamps the body in the gripper fingers 12 irrespective of the thickness of the body wall and bends that portion of the body wall adjacent its rear edge forming it into an outwardly extending rounded lip B (Fig. 2).

The lip B locks the can body in the gripper finger. It is such a lock that holds the can body firmly and prevents rotation of the body relative to the finger. The body is thus retained positively in a predetermined position while it travels along with the conveyer and this insures proper location of the body side seam when it passes over the solder roll. With gripping fingers having such a locking feature all can bodies are gripped equally well even though the thickness of the body wall varies within predetermined limits.

At the end of its path of travel along the guide rails 11 the can body is released from the gripper finger 12. This is effected preferably by a stationary cam 41 (Fig. 1) which is located adjacent the path of travel of the gripper fingers. The upwardly projecting tail sections 28 of the clamp dogs 16 engage against this cam as the gripper fingers move past and the clamp dogs are rocked in a direction opposite to their movement for locking the can body into place. Rocking of a clamp dog in this reverse direction lifts its clamp jaw 26 out of engagement with the can body and at the same time rocks the stop lugs 29 which press against the rear edge of the body. These stop lugs thus strip the body from the gripper fingers.

Release of the clamp dog 16 from the can body takes place when body and finger are nearing the terminal ends of the guide rails 11. Hence when the released can body rides off the ends of the rails, it falls from the gripper fingers 12 to any suitable place of deposit. The discharged can bodies usually are subjected subsequently to a flanging operation. In this operation the locking lip B formed in the can body by the gripper fingers 12 is ironed out entirely and in no way interferes with the functioning of the can body when it is embodied subsequently in a container.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A conveyer gripping device for can bodies and the like, comprising a pair of jaws carried by said conveyer and cooperatively mounted for relative movement, one of said jaws having a rearward extension thereon engaging said conveyer for holding the jaws against tilting movement relative to their supporting conveyer, one of said jaws having a key projection thereon arranged for cooperation with the other jaw in gripping a wall of the can body and locally bending a portion of the same to lock the can body against axial rotation, a said jaw having a lug engageable and movable by the can body for bringing said jaws together in clamping position on the can body.

2. A conveyer including a plurality of pivotally connected links and having a device for gripping can bodies and the like, said device comprising a pair of pivotally connected jaws one of which is attached to the conveyer adjacent a link thereof, the other of said jaws having a lug which extends across the space between the jaws and which is engaged by an edge of the can body for closing said jaws on the can body when the latter is brought into body clamping position, said conveyer attached jaw having a rearwardly extending lug engaging an adjacent conveyer link to prevent unitary tilting of said jaws relative to the conveyer, and a key projection in the face of one of said jaws disposed for cooperation with the adjacent face of the other jaw for bending and deforming a portion of the wall of the can body into locking engagement with and between the jaws to hold the can body against axial rotation relative to the jaws.

3. A conveyer having a device thereon for gripping can bodies and the like, comprising in combination a link chain conveyer, a carrier part constituting a link of said conveyer, a fixed jaw on said carrier part, a clamp dog pivotally connected to said carrier part, a clamp jaw on said dog spaced relative to said fixed jaw and having an inclined groove in its clamping face, a stop lug on said dog which extends across the space between the jaws and which is engageable by an edge of the can body for bringing said jaws together with the can body in between, and an inclined pin key secured in said fixed jaw and extending outwardly at an angle across its clamping face for movable nesting engagement within said clamp jaw groove for engaging and bending a lip in a localized portion of the can body to clamp the body between the jaws when the latter are in closed position to lock said can body against axial relation relative to the jaws.

4. A conveyer having a device thereon for gripping can bodies and the like, comprising a carrier part attached to said conveyer, a fixed jaw on said carrier part, a movable jaw mounted on the conveyer in spaced relation to said fixed jaw, a lug on said movable jaw extending across the space between said jaws and engageable and movable by an edge of a can body for rocking said movable jaw into body clamping position against the fixed jaw, said movable jaw being engageable against said carrier for locating the can body in the jaws in a predetermined position and being movable away from said carrier for releasing the can body from the jaws, an inclined groove in one of said jaws, and an inclined key element carried by and projecting from the face of the other of said jaws and disposed for movable nesting engagement within said groove when the jaws are in clamping position for engaging and deforming a portion of the wall of the can body between said key and groove and into locking engagement with the jaws to hold the can body against axial rotation relative to the jaws.

MAGNUS E. WIDELL.